J. G. PEACE & I. D. COMSTOCK.
TREE-PROTECTOR.

No. 185,044.  Patented Dec. 5, 1876.

UNITED STATES PATENT OFFICE.

JOHN G. PEACE AND ISAAC D. COMSTOCK, OF SALEM, MISSOURI.

IMPROVEMENT IN TREE-PROTECTORS.

Specification forming part of Letters Patent No. 185,044, dated December 5, 1876; application filed September 30, 1876.

*To all whom it may concern:*

Figure 1:
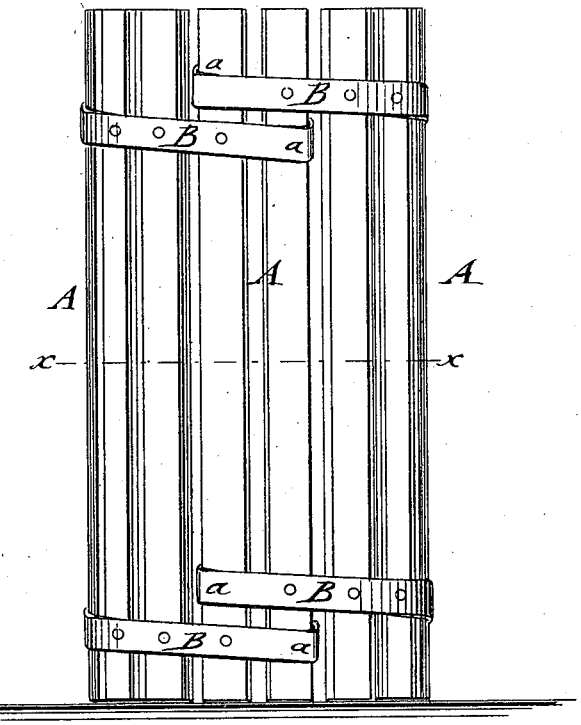
Figure 2:
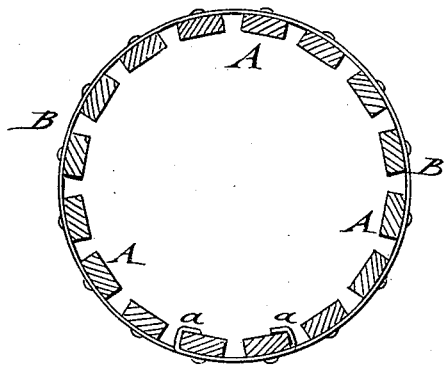

Be it known that we, JOHN G. PEACE and ISAAC D. COMSTOCK, of Salem, in the county of Dent and State of Missouri, have invented a new and improved Tree-Protector, of which the following is a specification:

In the accompanying drawing, Figure 1 represents a side elevation of our improved tree-protector, and Fig. 2 a horizontal section of the same, on the line $x$ $x$, Fig. 1.

Similar letters of reference indicate corresponding parts.

The invention relates to an improved device for protecting fruit-trees against the injurious influence of rabbits, mice, sheep, &c., the protector being of cheap construction, readily applied, and also available for protecting flower and vegetable beds.

The invention consists of a tree-box or protector, made of a number of slats nailed to top and bottom bands of sheet metal, and closed by the hook ends of the same lapping over the end slats.

In the drawing, A represents a number of sawed or split slats, of suitable thickness and length, which are connected by sheet-metal bands B, that are tacked to the slats near the upper and lower ends of the same. The ends of the straps B are extended beyond the end slats, and bent into hooks $a$ of sufficient size to lap readily around the opposite end slats. Both hooks $a$ of each band connect thereby the slats, and retain the box formed thereby in position around the fruit-tree.

The box is saturated with lead and oil, or painted in any suitable manner. Several of the boxes may also be connected by the end hooks, and arranged around flower or vegetable beds, to protect them against the ravages of fowls.

The slats rest all on the ground around the tree, and prevent the access of animals to the young fruit-trees. By turning the boxes, or reversing them, so that the bands are inside and the strips outside, the tree-boxes may be used for trees of four or five years additional growth. The tree-boxes may be manufactured very cheaply, and applied or removed with great facility.

What we claim is—

A tree-protector, consisting of slats A and bands B, the latter being arranged on the outside, and provided with end hooks, as shown and described.

JOHN G. PEACE.
ISAAC D. COMSTOCK.

Witnesses:
S. H. SHERLOCK,
E. D. LOWE.